United States Patent [19]

Lowery

[11] Patent Number: 5,575,198

[45] Date of Patent: Nov. 19, 1996

[54] CERAMIC MEAT COOKER

[76] Inventor: Gerald G. Lowery, P.O. Box 25, Rickreall, Oreg. 97371-0025

[21] Appl. No.: 429,912

[22] Filed: Apr. 27, 1995

[51] Int. Cl.$^6$ .................................................. A47J 43/18
[52] U.S. Cl. ............................... 99/426; 99/446; 99/449
[58] Field of Search ........................... 99/426, 345, 346, 99/419, 446, 449; 426/523, 509; D7/409

[56] References Cited

U.S. PATENT DOCUMENTS

| | | | |
|---|---|---|---|
| 3,392,665 | 7/1968 | Harnest | 99/426 |
| 4,027,583 | 6/1977 | Spanek et al. | 99/421 H |
| 4,064,797 | 12/1977 | Forlani | 99/426 |
| 4,380,190 | 4/1983 | Adamis | 99/419 |
| 4,896,011 | 1/1990 | Trucks | 99/419 |
| 5,081,916 | 1/1992 | Kühling et al. | 99/419 |
| 5,106,642 | 4/1992 | Ciofalo | 99/419 |
| 5,301,602 | 4/1994 | Ryczek | 99/345 |

*Primary Examiner*—David Scherbel
*Assistant Examiner*—James F. Hook
*Attorney, Agent, or Firm*—Marger, Johnson, McCollom & Stolowitz P.C.

[57] ABSTRACT

A ceramic meat cooker is inserted into a center portion of a piece of meat. The cooker is shaped to hold the meat in an upright vertical alignment above the rack of an oven or above a grill. While the heating element cooks the outside of the meat, the cooker cooks the inside of the meat providing more evenly cooked foods in a shorter amount of time. The meat cooker has a conical shape that holds the meat above a cooking surface. The meat in turn does not soak in saturated fat extruded from the meat during cooking providing cooked meat containing less fat. A flared base at the bottom end of the ceramic cooker supports the cooker and the meat in an vertical upright position eliminating the need for special spit attachments above the cooking system.

8 Claims, 2 Drawing Sheets

CERAMIC MEAT COOKER

BACKGROUND OF THE INVENTION

This invention relates generally to cooking low-fat meat and, more specifically, to a cone shaped ceramic cooker that inserts into a central portion of a piece of meat for cooking the meat from both the inside and outside at the same time.

Many cooking apparatus include thin metal rods (i.e., spits) for holding meat above the flame of an open fire or above the heating element in an oven. The spit holds the meat above the heating element allowing fat and other juices to drip down away from the meat. Since the drained fat is kept away from the meat during cooking, the cooked meat contains less fat and is, in turn, more healthy to eat. While roasting meat above a heating element is in general more healthy, the roasted meat is often dried out and less juicy than grilled meat.

Spits also require special attachments that support the spit above the heating element. The spit and the associated attachment are expensive to manufacture, difficult to clean, and in general are not interchangeable between different cooking equipment. For example, the spit used on an outdoor barbecue is typically not interchangeable with a spit used in an oven.

It is also difficult to evenly roast large portions of meat on a spit. For example, the central portion of the meat receives less heat than the outside portion of the meat. Thus, the outside surface of a large piece of meat must be overcooked to ensure sufficient cooking in the center portion of the meat. Overcooking further dries out the meat reducing moistness and flavor.

Vertical roasters are available which sits on an oven tray or on a grill. The roaster is made from wire or tin and inserts into the center of a piece of meat. While the vertical roaster is portable between different cooking equipment, the metal structure of the roaster is not effective in conducting and retaining heat in a uniform manner for even cooking the meat from the inside. For example, the wire structure of the roaster only sears small linear sections on the inside of the meat. Thus, the inside of the meat is cooked unevenly.

Accordingly, a need remains for an inexpensive meat cooker that produces healthier, more appetizing cooked meats.

SUMMARY OF THE INVENTION

A ceramic cone shaped meat cooker is insertable into a center portion of a piece of meat. The cooker is shaped to hold the meat in a vertical upright position above the rack of an oven or open grill. While the oven cooks the outside of the meat, the cooker is also heated directing heat to the internal cavity of the meat. Thus, the meat is cooked from both the inside and outside at the same time cooking the meat more evenly and in a shorter amount of time.

Because the meat is cooked from both the inside and outside at the same time, juices are sealed inside the meat making the meat more moist and flavorful than typical roasting techniques. The shape of the cooker allows fat to drip down and away from the inside of the meat. Thus, the meat does not soak in the fat during the cooking process causing the cooked meat to contain less fat.

The ceramic cooker includes a cone shaped main body having a circular bottom end for supporting the cone in an upright vertically aligned position. The top end of the main body is molded into a horizontal top cover making the cooker easier to clean.

A flared base section at the bottom end of the ceramic cooker provides additional support while holding both the cooker and the meat above a cooking surface. Since the cooker is self-supporting, no special attachments are needed to hold the ceramic cooker.

The cooker has a glazed outside surface that is easily insertable into the meat cavity and is also easy to clean. A cone shaped cavity provides a large inside surface area for receiving and distributing heat from the oven. The heat conduction and retention of the ceramic material in combination with the conical shape provide quick and even cooking on the inside of the meat.

The foregoing and other objects, features and advantages of the invention, will become more readily apparent from the following detailed description of a preferred embodiment of the invention which proceeds with reference to the accompanying drawings.

DETAILED DESCRIPTION

Figure 1:
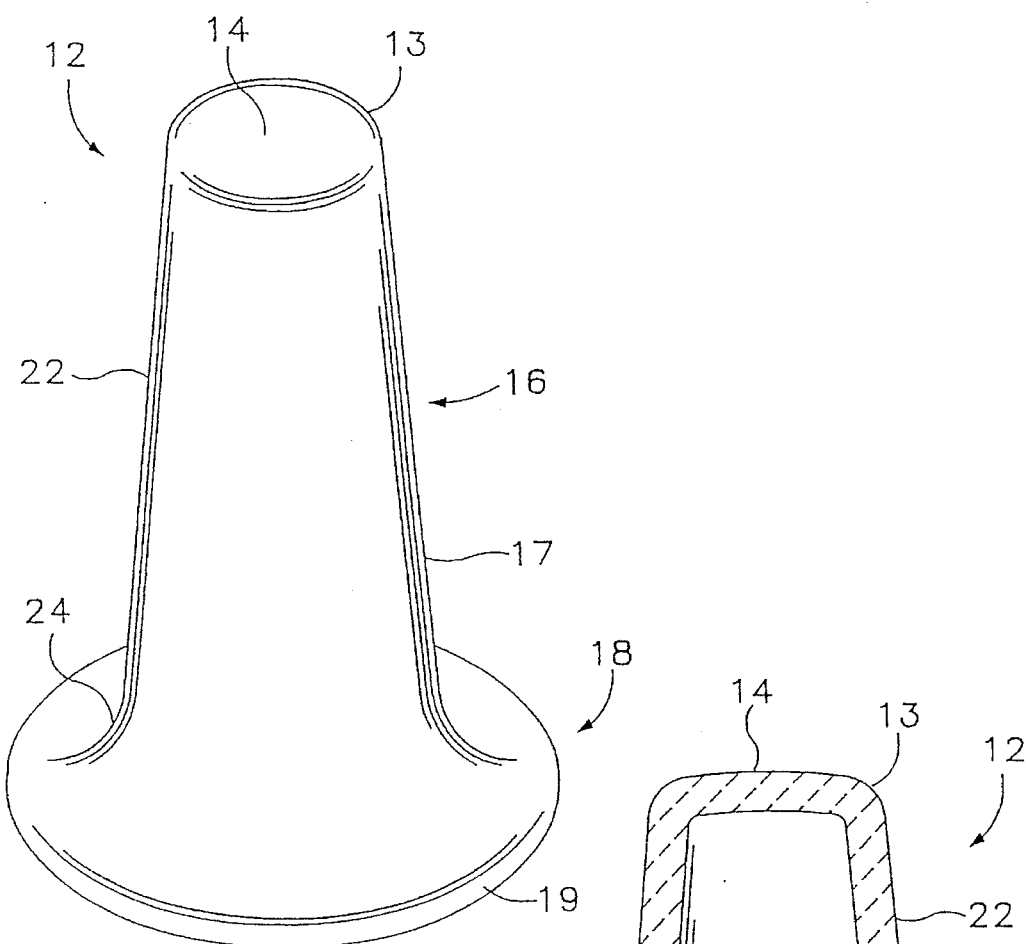
FIG. 1 is a perspective view of ceramic meat cooker according to the invention.
Figure 2:
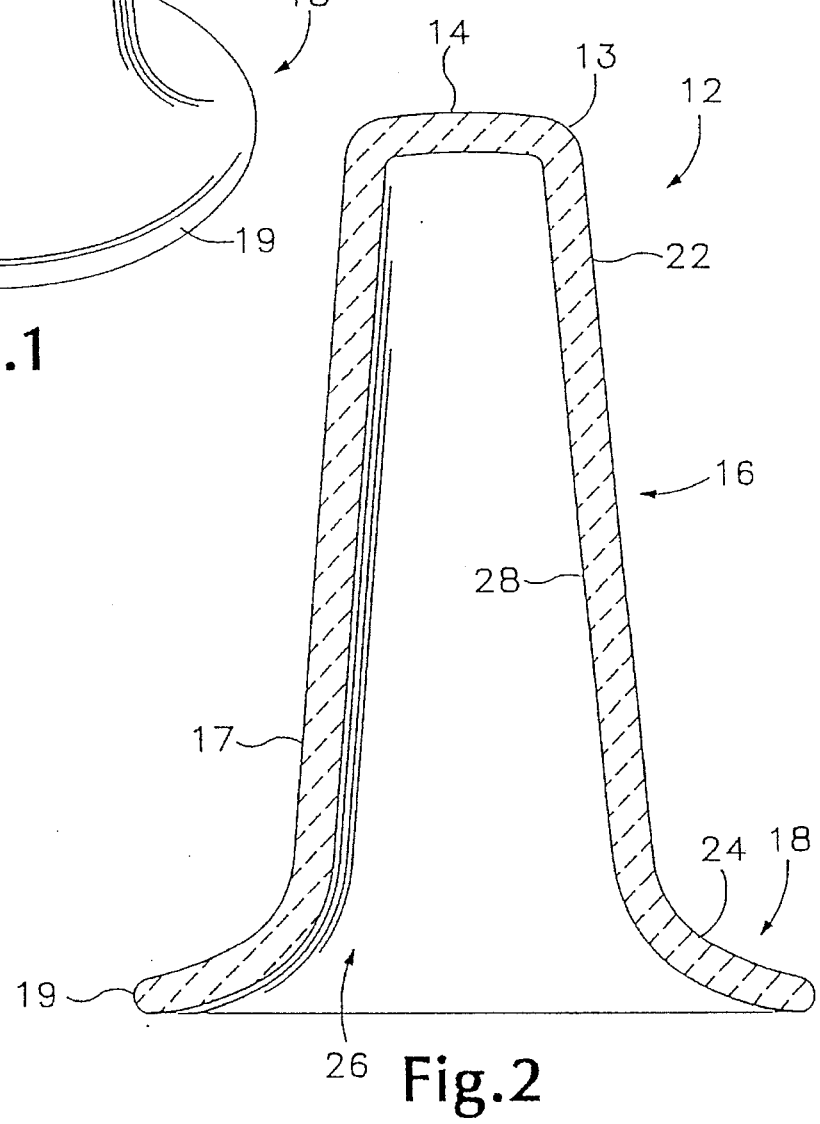
FIG. 2 is a sectional view of the ceramic meat cooker shown in FIG. 1.

FIG. 1 is a perspective view of a ceramic meat cooker 12 and FIG. 2 is a sectional view of the ceramic meat cooker 12 shown in FIG. 1. Referring to both FIGS. 1 and 2, the meat cooker 12 includes a conically shaped main body 16 having a circular top end 13 and a co-axially aligned circular bottom end 17. The main body 16 is elongated about a vertical axis and inserts into a cavity in a piece of meat (see FIG. 3).

A base member 18 flares laterally around the bottom end 17 of the main body 16. The base member 18 includes a rounded inside section 24 which is joined to the bottom end 17 of the main body 16. An outside edge 19 extends around the outside parameter of the base member 18.

The rounded inside section 24 provides a smooth continuous transition from the main body 16 allowing saturated fat from meat to drain away from the cooker 12. The flared base member 18 also provides additional stability for supporting the cone and the attached meat in an upright vertically aligned position.

The main body 16 includes a cone shaped cavity 26 elongated about the central axis. The inside cavity allows heat to freely rise up through the bottom end 17 of body 16. Thus, the entire outside surface 22 of cooker 12 can heat more rapidly and more evenly than a similar structure having a solid interior.

The top end 13 of the main body 16 is molded into a closed horizontally aligned top section 14. The top end 13 is rounded making a smooth transition to a top surface of section 14. The top section 14 keeps fat and other juices from flowing inside cavity 26. An outside surface 22 of the cooker 16 has a continuous smooth glazed finish that allows juices to freely drip down from the main body 16. Since the inside of the cooker 12 is less likely to get dirty and the outside of the cooker has a hard glazed surface, the cooker 12 is easy to clean after being used.

Figure 3:
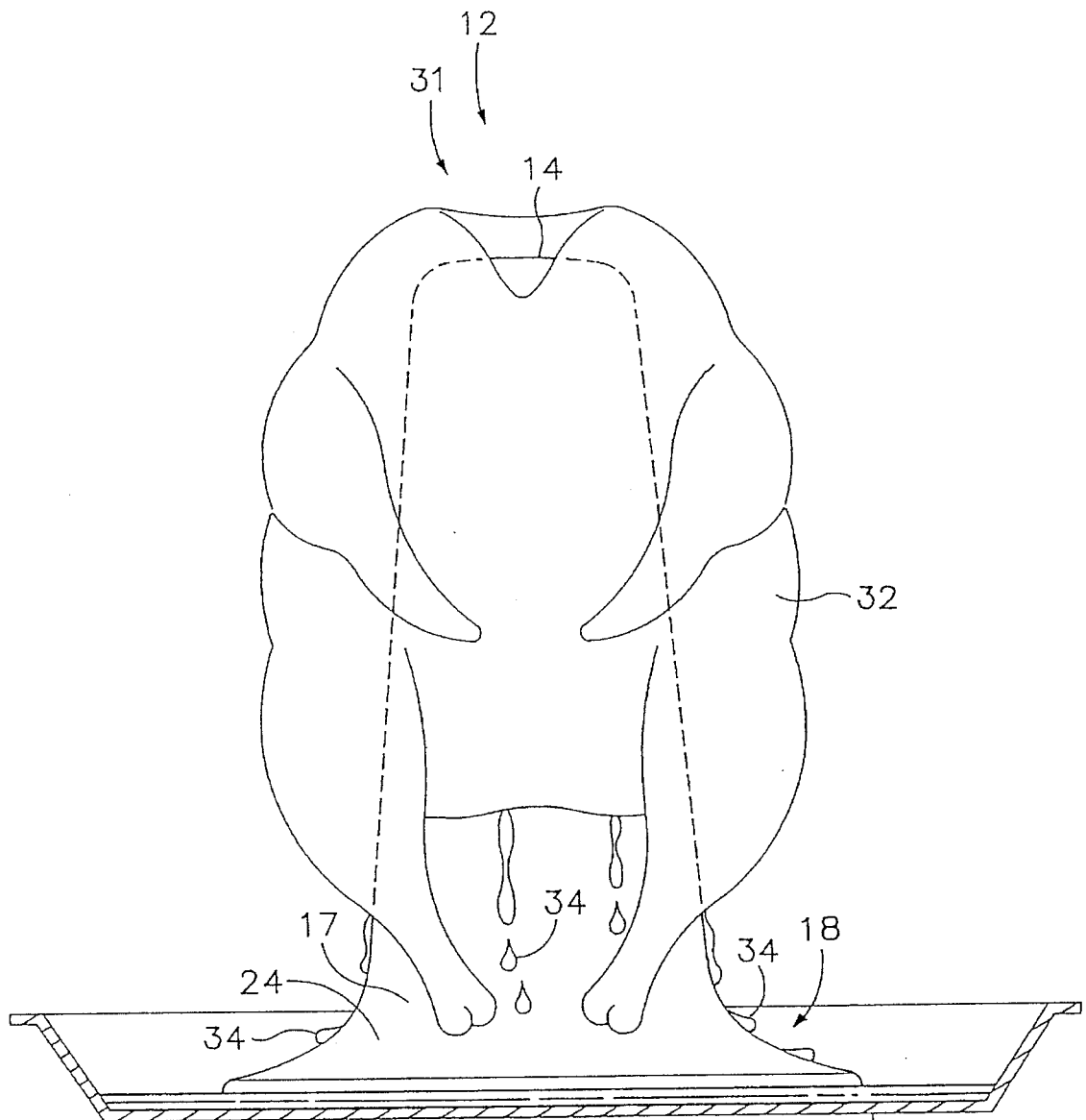
FIG. 3 is a front view of the ceramic meat cooker in FIG. 1 shown holding a chicken.

The top end 13 of the main body 16 has an outside diameter of approximately two and three eighth inches, and the bottom end 17 has an outside diameter of approximately three and one half inches. The outside diameter of the base is approximately five and three quarter inches. The height of the cooker from the base 18 to the top section 14 is approximately eight and one quarter inches. The main body 16, top section 14 and base 18 each have a substantially equal and uniform thickness of approximately three eighth of an inch. While a preferred embodiment is shown in FIGS. 1-3 modifications to the size and shape of the cooker 12 can be altered for different cooking applications. For example, a cooker of smaller diameter and height can be provided for smaller pieces of meat such as Cornish Game Hens.

Referring to FIG. 3, the cooker 12 is shown inserted through a central cavity 31 of a chicken 32 and placed in a drip pan 30. The cooker 12 operates in the following manner. The ceramic cooker 12 is first inserted into the central cavity 31 of the chicken 32. The wide diameter at the bottom end 17 of main body 16 jams against a bottom opening in the chicken 32 holding the chicken 32 suspended above both the base 18 and drip pan 30.

The cooker 12 after being placed in drip pan 30 is placed along with the drip pan on an oven rack or directly on an open grill. As the oven or grill begins to heat, both the outside surface of the chicken 32 as well as the cooker 12 also heat up. The cooker in turn begins to cook the internal cavity of the chicken 32. Thus, the chicken 32 is cooked from both the inside and outside at the same time.

The smooth ceramic surface 22 in combination with the rounded inside edge 24 of base 18 allow fat 34 from the chicken 32 to drip down freely into drip pan 30. Since the chicken 32 is suspended above the base 18 and drip pan 30, the chicken will not soak in fat accumulated in drip pan 30. Thus, the cooked meat is a healthier "lessfat" cooked meat.

Because the cooker 12 is self-supporting, no additional attachment apparatus is needed to support the cooker when placed in the oven. Thus, the cooker is easily relocated in different cooking apparatus. For example, the same cooker 12 can be placed on a Barbecue, Jen-air™ range or inside a conventional oven.

The ceramic composition and shape of the cooker 12 provides faster, more controlled heat conduction than metal spits. For example, a metal spit does not retain heat for as long as ceramic material. Further, metal spits have a smaller outside surface area than ceramic cooker 12. Conversely, the ceramic cooker 12 has a large outside surface area that provides faster, more even internal cooking inside cavity 31 of chicken 32.

After the chicken 32 has been cooked for a predetermined period of time, the cooker 12 is removed from the internal cavity and cleaned. While shown inserted into chicken 32, the cooker 12 is insertable into a central cavity formed in any meat.

Having described and illustrated the principles of the invention in a preferred embodiment thereof, it should be apparent that the invention can be modified in arrangement and detail without departing from such principles. I claim all modifications and variations coming within the spirit and scope of the following claims.

I claim:

1. A ceramic meat roaster for roasting a piece of meat, the meat having an internal cavity with inside walls that extend through the meat from a bottom end to a top end, the roaster comprising:

a vertically elongated ceramic body having a top and bottom end, the ceramic body including a circular cross-sectional shape that uniformly tapers from the bottom end to the top end forming a continuous enclosed conical surface for inserting and substantially filling the internal cavity thereby pressing against the inside walls of substantially the entire cavity; and a ceramic base joined to the bottom end of the ceramic body for supporting both the ceramic body and the piece of meat in a vertically aligned upright position, the ceramic base and ceramic body conducting heat radiated from a cooking system to the internal walls of the internal cavity of the piece of meat thereby searing the internal walls while the meat is roasted externally by the cooking system.

2. A cooker according to claim 1 wherein the ceramic body comprises a flat horizontal top end having a circular cross-sectional shape and having a diameter that uniformly increases from the top end to the bottom end.

3. A cooker according to claim 2 wherein the ceramic base flares laterally out from the bottom end of the ceramic body, the body supporting the meat above the base thereby allowing excretions from the meat to drain down and away from a bottom of said meat.

4. A cooker according to claim 3 wherein the ceramic body and the ceramic base include a smooth continuous glazed outside surface.

5. A cooker according to claim 4 wherein the ceramic body includes an inside surface extending substantially parallel with the outside surface forming a central cavity having a substantially conical shape.

6. A cooker according to claim 5 wherein horizontally aligned top section includes a cermically glazed outside surface molded into the top end of the ceramic body.

7. A method for cooking a piece of meat with a ceramic cooker, comprising:

forming the ceramic cooker into a tapered structure having an enclosed continuous outside surface;

inserting the ceramic cooker into a central cavity in the piece of meat, the piece of meat having internal cavity walls;

sizing the ceramic cooker into a continuous outside surface that presses against substantially the entire internal walls of said cavity while suspending the meat above a bottom end of said ceramic cooker;

placing the bottom end of the ceramic cooker onto a cooking support surface for a cooking system, the ceramic cooker holding the piece of meat in a vertical upright position above said cooking support surface;

conducting heat from the heating surface through the ceramic cooker into the central cavity of the piece of meat thereby roasting an outer surface of the cavity at the same time.

8. A method according to claim 7 wherein the ceramic cooker drains saturated fat extruded from the central cavity both vertically downward and laterally away from the internal cavity.

* * * * *